March 11, 1969 W. GOODWIN 3,432,158
VARIABLE TORQUE ARM
Filed Sept. 27, 1967
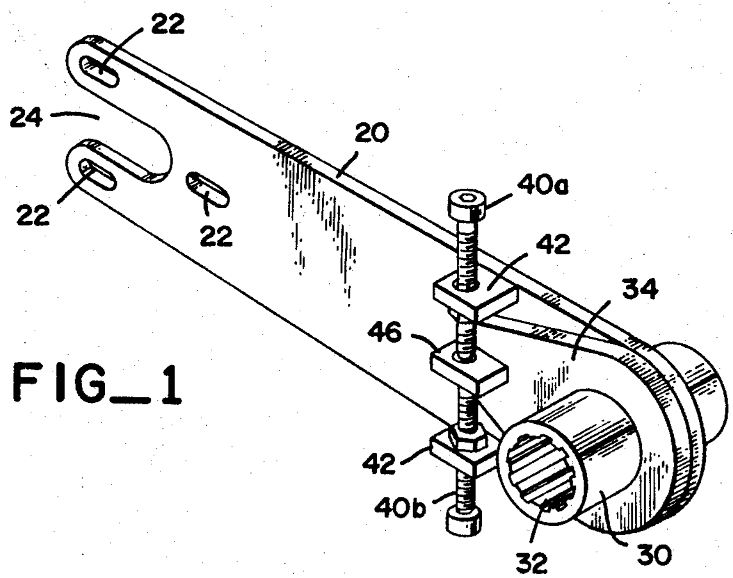
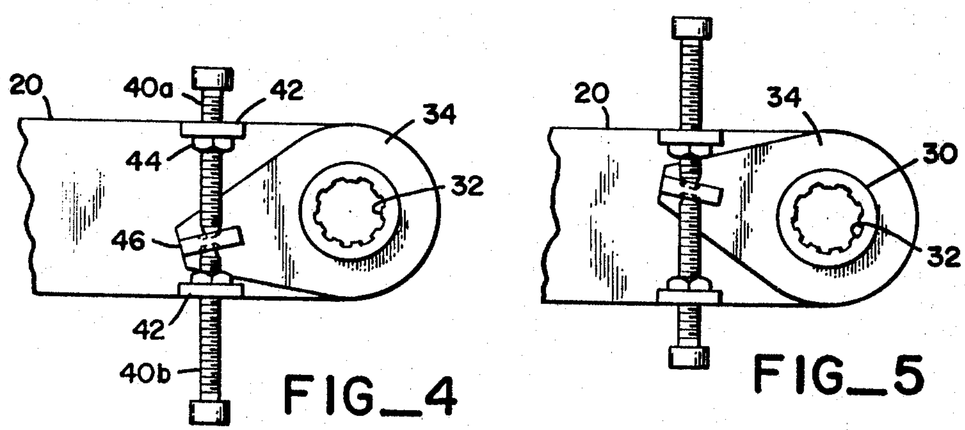
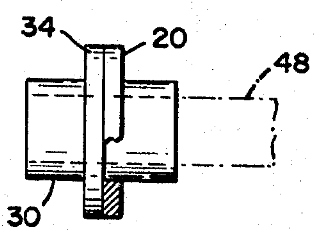
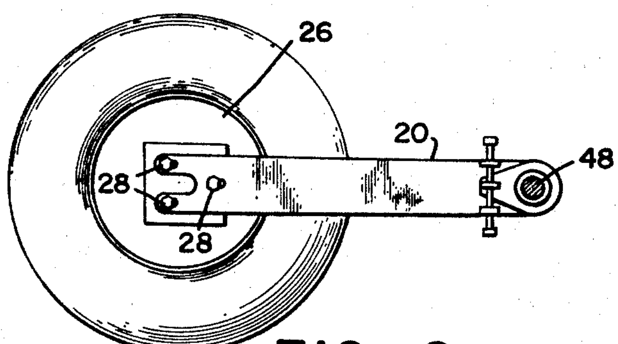
INVENTOR.
WARREN GOODWIN
BY
Townsend and Townsend
ATTORNEYS United States Patent Office 3,432,158

Patented Mar. 11, 1969

3,432,158

VARIABLE TORQUE ARM

Warren Goodwin, 17808 Tourney Road, Los Gatos, Calif. 95030

Filed Sept. 27, 1967, Ser. No. 671,059

U.S. Cl. 267—57 3 Claims

Int. Cl. B60g *11/18;* F16f *1/36;* B62d *21/14*

ABSTRACT OF THE DISCLOSURE

A variable torque arm in which an internally splined hub is mounted on one end, the hub being movable angularly with respect to the lever arm. The hub is connected to a plate the end of which is provided with a projection captured between adjusting bolts mounted on the lever arm. Movement of the bolts changes the relative angular position of the hub and the lever arm.

This invention relates to variable torque arms and, more particularly, to a torque arm for use in motor vehicles equipped with torsion bars.

In recent years certain automobile manufacturers have replaced conventional leaf and coil springs with torsion bars. Torsion bars have advantages over conventional automobile springs but also have certain disadvantages. One of these disadvantages is the inability to adjust the amount of load which the torsion bar and therefore the automobile may carry. With conventional springs it is possible to add additional leaves or "helper" springs in order to accommodate increased passenger loads or the increased loads associated with the towing of trailers so that the automobile remains relatively level despite heavy loading.

The present invention was designed to overcome the inherent inability to adjust a torsion bar suspension by introducing an adjustment feature into the connection between the wheel and the torsion bar. This is accomplished in the present construction by use of an internally splined hub mounted at one end of a torque transmitting lever arm. The hub is affixed to an adjustment plate one end of which is provided with a projection captured between a pair of adjustment bolts. The adjustment bolts are in turn mounted at the edges of the lever arm so that movement of the bolts results in a change of the relative angle of the hub with respect to the lever arm. The change of relative angle between the hub and the lever arm when the variable torque arm is mounted on a motor vehicle results in a change in the amount of load required to return the lever arm to the same relative position.

The use of the present invention permits a simple and easy adjustment of the loading of the vehicle torsion bars with a minimum of tools. The end result of the use of the present invention on a conventional automobile is that such an automobile is safer to operate whether heavy or light loads are being carried in the vehicle.

In the drawing:

FIG. 1 is a perspective view of the variable torque arm;

FIG. 2 is a fragmentary elevation showing a torque arm attached to the wheel mounting of a motor vehicle;

FIG. 3 is a partial section in end view of the torque arm;

FIG. 4 is a fragmentary detail showing one position of adjustment of the hub; and FIG. 5 is a view similar to FIG. 4 showing the hub in an opposite position of adjustment.

Referring now more particularly to the drawing in which similar figures refer to the same parts in each of the several views, the variable torque arm is shown generally in FIG. 1. The torque arm comprises a lever arm 20 one end of which is provided with bolt holes 22 and which has a slot 24 located between the bolt holes to permit the lever arm to be bolted to an automobile wheel between backing plate 26 and its axle housing by means of conventional bolts 28. At the opposite end of the lever arm is a hub 30 having an internal spline 32. The hub 30 is affixed to adjusting plate 34. The hub 30 is mounted within a bore 36 in the lever arm 20 so that the hub and plate may be rotated with respect to the lever arm 20.

The adjustment of the angular relationship between the hub and the lever arm is accomplished by means of a pair of adjusting bolts, the upper one designated **40*a* and the lower one 40*b*. Each of the bolts is mounted on a support 42 and each bolt is provided with a lock nut 44** so that any position of adjustment of the bolt may be firmly fixed.

The adjusting plate 34 has a projecting dog 46 mounted on its elongated end. The dog is provided with recesses on its upper and lower surfaces within which the ends of the bolts **40*a* and 40*b*** are received.

In operation, the variable torque arm 20 is bolted between the mounting plate 26 of the wheel of a motor vehicle and its axle housing. The internal splines 32 of the hub 30 slip over the complementary spines of the torsion bar 48 with which the motor vehicle is provided.

The torsion bar 48 is conventionally mounted in a housing (not separately shown) which terminates near the end of the torsion bar. When the variable torque arm 20 carrying the adjusting plate 34 and its hub 30 is slipped over the end of the torsion bar, it is retained in place by a dust cover plate (not separately shown). The hub 30 is then captured between the dust cover plate and the end of the torsion bar housing, although it remains free to rotate.

For normal loading, the relative position of the adjusting plate 34 is as shown in FIG. 2 with the dog 46 located approximately in the center of the lever arm 20. If a heavy load is contemplated for the motor vehicle, all that is required is for the relative angular position of the adjusting plate 34 to be changed with respect to the lever arm 20. For holding a heavier load the lower bolt **40*b* would be tightened while at the same time upper bolt 40*a* is loosened so that the adjusting plate 34 would take a position such as that shown in FIG. 5. Conversely, should a lighter load be desired, the adjusting bolts 40*a* and 40*b*** would be turned relative to each other in order to move the adjusting plate to a position such as that shown in FIG. 4. It is thus clear that by the simple movement of two bolts on each wheel of a motor vehicle the amount of load which may be carried by the vehicle may be readily adjusted.

I claim:

1. A variable torque arm for a vehicle equipped with a torsion bar suspension comprising: a lever arm; means for connecting one end of said lever arm to the support of a wheel of the motor vehicle; a hub mounted the other end of said lever arm; means for varying the relative angular position between the hub and the lever arm, said means for varying the relative angular position between the hub and the lever arm comprising a plate member, said hub secured thereto, a post mounted on said plate member and spaced from said hub, a lug mounted on said lever arm, and screw means engaged between said lug and said post; and means for engaging the hub with the torsion bar of the motor vehicle.

2. A device for varying the loading of a motor vehicle torsion bar comprising: a lever arm, one end of said arm adapted for connection to the wheel mounting of the vehicle, the other end of said lever arm having a bore therein, a hub pivotally mounted in said bore, said hub having an internal spline adapted for engagement with a torsion bar affixed to the vehicle, said hub aligned with its axis generally perpendicular to a surface of the lever arm, an elongate plate affixed to said hub and movable with the hub parallel to said lever surface, and means for controlling the relative angular positions of said lever arm and said plate.

3. The device of claim 2 and wherein said controlling means includes a screw member connecting the lever arm with the plate and including means for locking said lever arm and said plate in their relative angular positions.

References Cited

UNITED STATES PATENTS

| | | | |
|---|---|---|---|
| 2,227,762 | 1/1941 | Ronning | 267—57 |
| 2,606,758 | 8/1952 | Collier | 267—57 |
| 2,942,871 | 6/1960 | Kraus | 267—57 |

KENNETH H. BETTS, *Primary Examiner.*

ROBERT R. SONG, *Assistant Examiner.*

U.S. Cl. X.R.

280—43.18